US010273695B2

(12) United States Patent
Veldhoff

(10) Patent No.: US 10,273,695 B2
(45) Date of Patent: Apr. 30, 2019

(54) GUTTER DOWNSPOUT END GUARD

(71) Applicant: Norman Lee Veldhoff, Holland, MI (US)

(72) Inventor: Norman Lee Veldhoff, Holland, MI (US)

(*) Notice: Subject to any disclaimer, the term of this patent is extended or adjusted under 35 U.S.C. 154(b) by 0 days.

(21) Appl. No.: 15/955,814

(22) Filed: Apr. 18, 2018

(65) Prior Publication Data

US 2018/0305932 A1 Oct. 25, 2018

Related U.S. Application Data

(60) Provisional application No. 62/489,124, filed on Apr. 24, 2017.

(51) Int. Cl.
*E04D 13/08* (2006.01)
*F16L 3/00* (2006.01)
*F16L 3/10* (2006.01)

(52) U.S. Cl.
CPC .............. *E04D 13/08* (2013.01); *F16L 3/006* (2013.01); *F16L 3/1016* (2013.01); *E04D 2013/0806* (2013.01); *E04D 2013/0813* (2013.01)

(58) Field of Classification Search
CPC ............ E04D 13/08; E04D 2013/0806; E04D 2013/0813; E04D 2013/0833; E04D 2013/082; F16L 3/006; F16L 3/1016; F16L 3/10; F16L 3/04; F16L 3/1008; F16L 5/04; E04H 12/2269; E02D 5/64; E02D 5/226
USPC ........................... 52/16, 232, 220.8, 835, 170
See application file for complete search history.

(56) References Cited

U.S. PATENT DOCUMENTS

| | | | | |
|---|---|---|---|---|
| 500,230 A * | 6/1893 | Engel | ........................ | F16L 3/04 248/71 |
| 731,752 A * | 6/1903 | Cadwell | .............. | E04H 12/2292 52/295 |
| 772,928 A * | 10/1904 | Dunlap | ............... | E04H 12/2269 52/298 |
| 1,292,034 A * | 1/1919 | Peirce | ........................ | F16L 3/10 248/68.1 |
| 1,789,393 A * | 1/1931 | Spring | ................ | E04H 12/2292 52/170 |
| 1,950,677 A * | 3/1934 | Hogan | ................ | E04H 12/2292 52/835 |

(Continued)

OTHER PUBLICATIONS

Downspout Safety Cap 2×3 4pk White; www.ebay.com; downloaded Feb. 28, 2017.

*Primary Examiner* — Kyle J. Walraed-Sullivan
(74) *Attorney, Agent, or Firm* — Gardner, Linn, Burkhart & Ondersma LLP

(57) ABSTRACT

The present invention provides a shielding assembly for concealing and supporting exposed edges of an open end of a gutter downspout. The shielding assembly includes two rigid bracket members that each have a body portion and leg portions that integrally extend from opposing ends of the body portion. The bracket members are configured to engage together around the exposed edges of the gutter downspout with the leg portions overlapped with each other to form overlapping end sections. The overlapping end sections are each configured to be fastened together and secured to the gutter downspout with a fastener that extends through the respective overlapping end section and an outer wall of the gutter downspout.

8 Claims, 9 Drawing Sheets

(56) References Cited

U.S. PATENT DOCUMENTS

| | | | | |
|---|---|---|---|---|
| 1,995,874 A * | 3/1935 | Van De Mark | E04H 12/2292 | 238/29 |
| 1,999,098 A * | 4/1935 | Hillyer | E04H 12/2292 | 52/835 |
| 2,323,362 A * | 7/1943 | Weiss | F16L 3/04 | 174/159 |
| 2,446,256 A * | 8/1948 | Young | E04D 13/08 | 210/445 |
| 2,707,034 A * | 4/1955 | Hetrick | E04H 12/00 | 174/42 |
| 2,897,553 A * | 8/1959 | Gorrow | E04H 12/2292 | 405/216 |
| 2,975,805 A * | 3/1961 | Horn | A01G 25/00 | 137/615 |
| 3,182,940 A * | 5/1965 | Emery | F16B 2/06 | 248/74.4 |
| 3,430,905 A * | 3/1969 | Pepe | F16L 3/04 | 248/300 |
| 3,911,954 A * | 10/1975 | Johnson | E04D 13/08 | 137/615 |
| 4,516,365 A * | 5/1985 | Chapman | E04H 12/2292 | 52/170 |
| 4,557,447 A * | 12/1985 | Combe | F16L 3/127 | 248/62 |
| 4,644,715 A * | 2/1987 | Burell | E04H 12/2292 | 175/262 |
| 4,756,130 A * | 7/1988 | Burtelson | E04G 23/0218 | 52/170 |
| D301,164 S * | 5/1989 | Weaver | | 52/16 |
| 5,133,164 A * | 7/1992 | Legler | E04H 12/2261 | 52/165 |
| 5,345,732 A * | 9/1994 | Knight | E04H 12/2292 | 52/153 |
| 5,371,986 A * | 12/1994 | Guditis | E04H 12/2292 | 52/170 |
| 5,375,891 A * | 12/1994 | Sicotte | E04D 13/08 | 137/615 |
| 5,511,829 A * | 4/1996 | Sicotte | E03F 1/002 | 137/615 |
| 5,560,397 A * | 10/1996 | Miller | H02G 3/22 | 138/110 |
| 5,622,356 A * | 4/1997 | Duggan | E04H 12/2292 | 256/1 |
| 5,727,762 A * | 3/1998 | Cosentino | F16L 3/1016 | 248/154 |
| 5,961,081 A * | 10/1999 | Rinderer | H02G 3/32 | 248/305 |
| 6,024,127 A * | 2/2000 | Johnson | E04D 13/08 | 137/357 |
| 6,079,165 A * | 6/2000 | Bingel, III | E04G 23/0218 | 52/170 |
| 6,151,860 A * | 11/2000 | Reisdorff | E04H 12/34 | 52/170 |
| 6,176,062 B1 * | 1/2001 | Fayle | E01F 15/0469 | 405/216 |
| D452,915 S * | 1/2002 | Kieffer | | D25/122 |
| D521,656 S * | 5/2006 | Terrels | | D25/122 |
| D555,772 S * | 11/2007 | McCall | | D23/261 |
| 7,464,512 B1 * | 12/2008 | Perina | E04H 12/08 | 52/651.01 |
| 7,627,995 B1 * | 12/2009 | Yoder | E04H 12/2253 | 248/519 |
| 7,685,778 B2 * | 3/2010 | Edell | E04D 13/08 | 43/121 |
| 7,739,839 B1 * | 6/2010 | Crabtree | E04D 13/08 | 138/96 R |
| 8,322,083 B1 * | 12/2012 | Kessler | E04D 13/08 | 137/615 |
| D674,471 S * | 1/2013 | Balderas | | D23/267 |
| 8,528,263 B2 * | 9/2013 | Schmidt | E04D 13/08 | 137/357 |
| 8,746,632 B2 * | 6/2014 | Walraven | F16L 5/00 | 248/62 |
| 9,238,916 B2 | 1/2016 | Schneider | | |
| 9,359,785 B2 * | 6/2016 | Catt | A01G 17/14 | |
| 9,611,648 B1 * | 4/2017 | Fiecke | E04D 13/08 | |
| 2002/0000499 A1 * | 1/2002 | Aoki | F16L 3/10 | 248/74.4 |
| 2002/0005018 A1 * | 1/2002 | Popa | E04D 13/064 | 52/16 |
| 2003/0163960 A1 * | 9/2003 | Hadden | E04C 3/30 | 52/170 |
| 2004/0134161 A1 * | 7/2004 | Lockwood | E04C 5/07 | 156/91 |
| 2005/0061925 A1 * | 3/2005 | Kirschner | F16L 3/1016 | 248/49 |
| 2005/0210821 A1 * | 9/2005 | Bingel, III | E04C 3/30 | 52/834 |
| 2005/0230569 A1 * | 10/2005 | Kirschner | F16L 3/1016 | 248/74.1 |
| 2007/0124897 A1 * | 6/2007 | Wilson | F16L 3/1016 | 24/100 |
| 2007/0131823 A1 * | 6/2007 | Mominee | F16L 3/1016 | 248/62 |
| 2007/0245645 A1 * | 10/2007 | Nesbitt | E04H 12/2292 | 52/169.9 |
| 2008/0023959 A1 * | 1/2008 | Crawford | E04D 13/08 | 285/226 |
| 2008/0251651 A1 * | 10/2008 | Jackson | F16L 3/1016 | 248/62 |
| 2008/0295418 A1 * | 12/2008 | Edell | E04D 13/08 | 52/16 |
| 2009/0266026 A1 * | 10/2009 | Hannay | E04H 12/2292 | 52/745.17 |
| 2011/0041416 A1 * | 2/2011 | Schmidt | E04D 13/08 | 52/16 |
| 2011/0173897 A1 * | 7/2011 | Schneider | E04D 13/08 | 52/16 |
| 2012/0175437 A1 * | 7/2012 | Sloan, Jr. | B05B 1/00 | 239/597 |
| 2012/0217353 A1 * | 8/2012 | Hennon | F16L 3/1091 | 248/67.5 |
| 2012/0247580 A1 * | 10/2012 | Guinyard | E04D 13/08 | 137/357 |
| 2012/0255259 A1 * | 10/2012 | Shute | E04H 17/268 | 52/835 |
| 2012/0285567 A1 * | 11/2012 | Kessler | E04D 13/08 | 137/615 |
| 2013/0026306 A1 * | 1/2013 | Mominee | F16L 5/00 | 248/62 |
| 2014/0117661 A1 * | 5/2014 | Harman | E04D 13/08 | 285/179 |
| 2014/0374547 A1 * | 12/2014 | Langenderfer | E02D 5/80 | 248/87 |
| 2015/0082742 A1 * | 3/2015 | Catt | A01G 17/14 | 52/835 |
| 2016/0017632 A1 * | 1/2016 | Rodriguez | E04H 12/2292 | 52/741.15 |
| 2016/0040820 A1 * | 2/2016 | Morris | F15D 1/04 | 138/39 |
| 2016/0281364 A1 * | 9/2016 | Lolio, Jr. | E04D 13/08 | |
| 2017/0152662 A1 * | 6/2017 | Elder | E04D 13/08 | |
| 2017/0211277 A1 * | 7/2017 | Kerr | E04D 13/08 | |
| 2017/0356570 A1 * | 12/2017 | Downey | F16L 3/01 | |

* cited by examiner

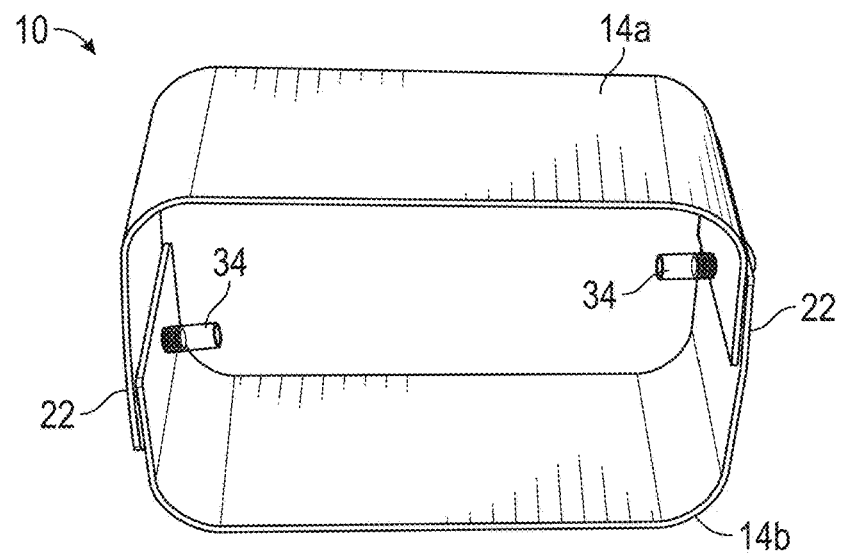
FIG. 9
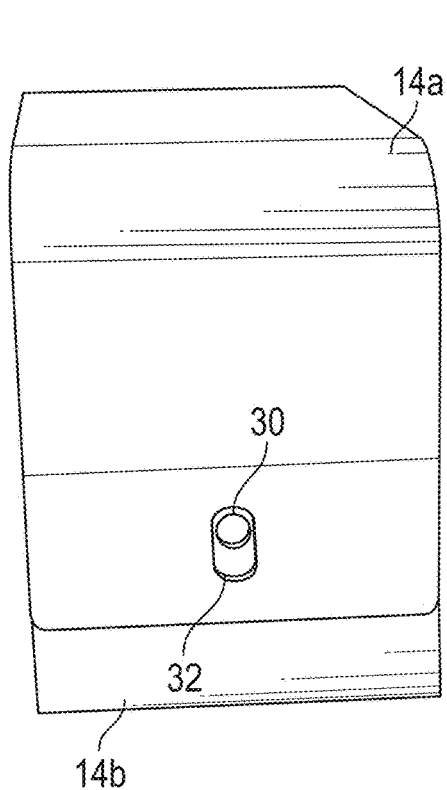 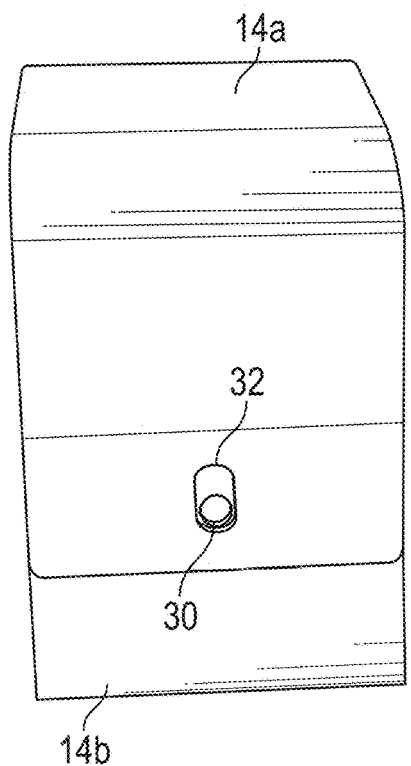
FIG. 10A          FIG. 10B

GUTTER DOWNSPOUT END GUARD

CROSS REFERENCE TO RELATED APPLICATION

The present application claims the benefit of U.S. provisional application, Ser. No. 62/489,124, filed Apr. 24, 2017, which is hereby incorporated herein by reference in its entirety.

FIELD OF THE INVENTION

The present invention generally relates to protective devices disposed or otherwise attached at ends of gutter downspouts, and more particularly, to protective devices that reinforce and conceal exposed edges at the open ends of metal downspouts.

BACKGROUND OF THE INVENTION

It is relatively common for rain gutter systems on residential and commercial buildings to have metal downspouts, such as elbows or extensions, which terminate at open ends that are positioned to direct the flow of water out of the downspout to a desired location on or near the ground, such as a splash block, landscape bed, or similar drainage surface. These metal downspouts are typically made of thin sheet metal, such as aluminum, that is formed with exposed edges at the open end that can be sharp to the touch. In addition to being potentially dangerous, these exposed edges at the openings can be susceptible to being easily bent, twisted, cut, and/or frayed, such as from contact with a string trimmer, so as to potentially reduce the effectiveness of directing the flow of rain water and to make the downspout opening jagged and unsightly, which can also increase the severity of the dangerously sharp edges at the opening.

SUMMARY OF THE INVENTION

The present invention provides a shielding assembly for concealing and supporting exposed edges of an open end of a gutter downspout, such that the open end is not susceptible to damage from string trimmers and the like. The shield assembly may include a bent metal bracket assembly that is attached around the open end of the gutter downspout in a manner that is rigid and secure with the gutter downspout, so as to reinforce the commonly thin and weak sheet material of the gutter downspout at the opening. The bracket assembly may, optionally, be adjustable to size and orient the bracket assembly in a manner that fits snuggly around the opening and does not deter the draining function of the downspout.

According to one aspect of the present invention, a shielding assembly is provided for concealing and supporting exposed edges of an open end of a gutter downspout. The shielding assembly includes two rigid bracket members that each have a body portion and leg portions that integrally extend from opposing ends of the body portion. The bracket members are configured to engage together around the exposed edges of the gutter downspout with the leg portions overlapped with each other to form overlapping end sections. The overlapping end sections are each configured to be fastened together and secured to the gutter downspout with a fastener that engages the respective overlapping end section and an outer wall of the gutter downspout.

Optionally, an innermost bracket member of each of the overlapping end sections may have a pilot hole that is sized to be threadably engaged by the fastener and an outermost bracket member of the overlapping end sections may have a slot hole that is configured for the fastener to extend through and to allow the bracket members to be adjusted relative to each other, such as for placing inner surfaces of the body portions in contact with opposing outer walls of the gutter downspout. Each bracket member may also include a short leg and a long leg that integrally extend from opposing ends of the body portion, where the long leg is provided with the slot hole and the short leg is provided with the pilot hole.

According to another aspect of the present invention, a shielded rain gutter downspout assembly may be provided that includes a gutter downspout having an open end. Two rigid bracket members each have a body portion and leg portions that integrally extend from opposing ends of the body portion. The bracket members are engaged together around exposed edges at the open end of the gutter downspout with the leg portions overlapped with each other to form overlapping end sections. At least two fasteners are also provided that each extends through one of the overlapping end sections and engages an outer wall of the gutter downspout to secure the overlapping end sections to the gutter downspout.

These and other objects, advantages, purposes, and features of the present invention will become apparent upon review of the following specification in conjunction with the drawings.

BRIEF DESCRIPTION OF THE DRAWINGS

FIG. 9 is an end elevational view of the shielding assembly of FIG. 8;

FIG. 10A is a side elevational view of the shielding assembly of FIG. 8, with the fastener removed to show the slot hole and the pilot hole in the bracket members;

FIG. 10B is a side elevational view of the shielding assembly of FIG. 8, with the bracket members moved away from each other by adjusting the slot hole relative to the pilot hole;

DETAILED DESCRIPTION OF EMBODIMENTS

Figure 1:
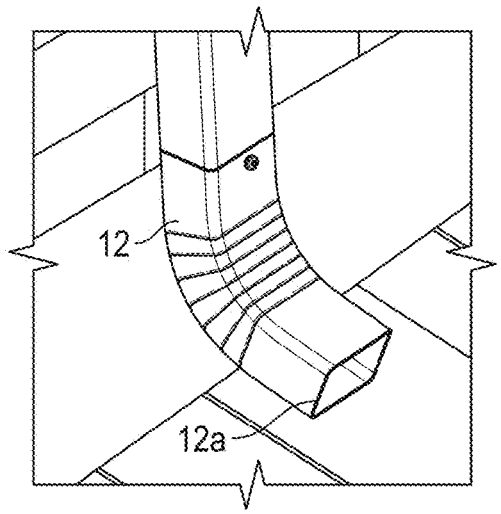
FIG. 1 is a perspective view of a gutter downspout having exposed edges at its open end.
Figure 1A:
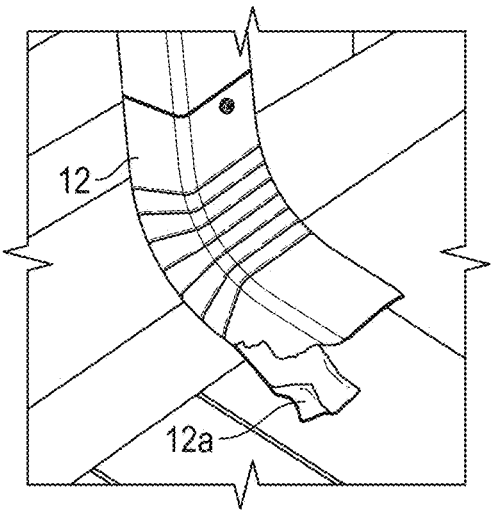
FIG. 1A is a perspective view of a gutter downspout that has been contacted by a string trimmer leaving cut and jagged exposed edges at the open end.

As generally depicted in FIGS. 1 and 1A, common gutter downspouts are shown extending down from the roof of a building and terminating at an elbow shaped attachment. The elbow or extension or the like has an open end that is positioned to direct the flow of rain water out of the gutter downspout and away from the building, and thus leaving the open end exposed and accessible to people outside the building, such as children. As shown in FIG. 1A, a string trimmer that is used to cut grass and weeds around the building has contacted and damaged the open end of the downspout, which can be easily and unintentionally done due to metal downspouts typically being made of thin sheet metal, such as aluminum, that is weak and easily damaged. The exposed edges at the open ends of the gutter downspouts, such as shown in FIGS. 1 and 1A are sharp to the touch and potentially dangerous, especially the jagged sharp edges shown in the damaged downspout of FIG. 1A.

Referring now to FIGS. 2-19B and the illustrative embodiments depicted therein, a shielding assembly 10 is provided for concealing and supporting the exposed edges 12a of an open end of a gutter downspout 12, such that the downspout edges defining the open end are generally not accessible and not susceptible to damage from string trimmers and the like. The shield assembly 10 includes a bent metal bracket assembly that is attached around the open end of the gutter downspout 12 in a manner that is rigid and secure with the gutter downspout, so as to reinforce the thin and weak sheet material of the gutter downspout at the opening. The shielding assembly 10 includes two rigid bracket members 14a, 14b that each have a body portion 16a, 16b and leg portions 18a, 18b, 20a, 20b (FIG. 7A) that integrally extend from opposing ends of the body portion 16a, 16b. The bracket members 14a, 14b engage together around the exposed edges 12a of the gutter downspout with the leg portions overlapped with each other to form overlapping end sections 22. The overlapping end sections 22 are each fastened together and secured to the gutter downspout 12 with a fastener 24 that extends through the respective overlapping end section 22 and an outer wall of the gutter downspout 12. The shield assembly 10 may, optionally, be adjustable to size and orient the bracket assembly in a manner that fits snuggly around the opening and does not deter the draining function of the downspout.

In the illustrated embodiment, the two rigid bracket members 14a, 14b are substantially identical to one another and, thus, are interchangeable. This reduces the manufacturing cost by requiring only one bracket member shape, and facilitates assembly because any bracket member in a group of compatible bracket members will be suitable for use with any other bracket member in that group. However, it is further envisioned that the bracket members could be made in different and compatible shapes, such as for male-female assembly. It will also be appreciated that the material (such as sheet aluminum) used for the rigid bracket members 14a, 14b may be sufficiently pliable and capable of elastic and/or plastic deformation by manual manipulation by users having typical hand strength, which facilitates assembly of the bracket members 14a, 14b around gutter downspouts that are somewhat deformed or of non-standard shape.

Figure 3:
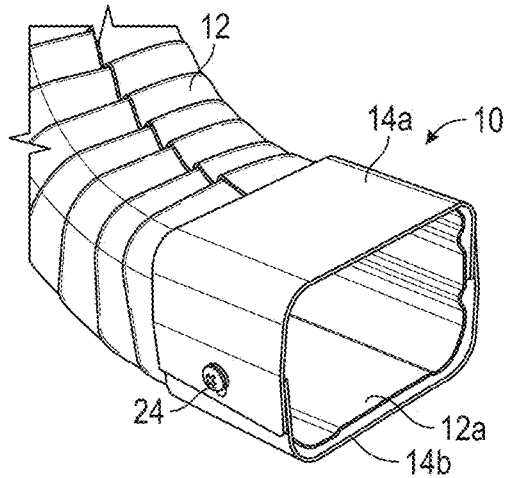
FIG. 3 is a perspective view of another gutter downspout having a shielding assembly fastened at its open end.
Figure 4:
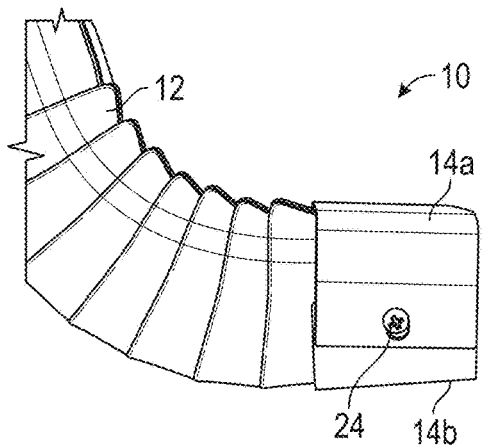
FIG. 4 is a side elevational view of the shielding assembly and the gutter downspout shown in FIG. 3.
Figure 5:
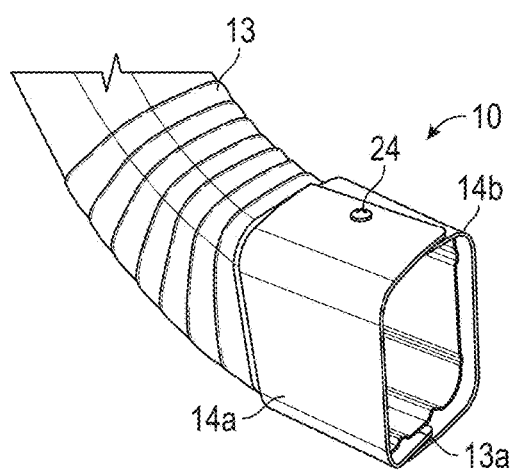
FIG. 5 is a perspective view of another gutter downspout having a shielding assembly fastened at its open end in an orientation that is perpendicular to that shown in FIG. 3.
Figure 6:
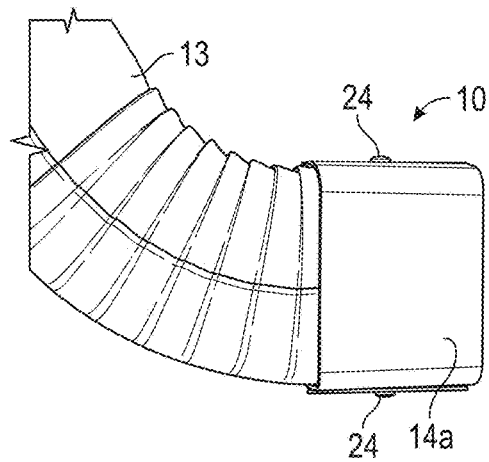
FIG. 6 is a side elevational view of the shielding assembly and the gutter downspout shown in FIG. 5.

As shown in FIGS. 3 and 4, the shielding assembly 10 is attached around the open end of the gutter downspout 12 with the bracket members 14a, 14b extending beyond the edge 12a of the gutter downspout 12 to generally conceal and prevent access to the sharp edge 12a. When attached at the gutter downspout 12, the inner surfaces of bracket members 14a, 14b are attached to contact the exterior surface of the downspout and fit in close engagement around the exposed edge 12a. To do so, the bracket members 14a, 14b may be adjustably moved relative to each other, such as about the fastener 24, to place the bracket members 14a, 14b in closer or further proximity relative to each other and to pivot the bracket members 14a, 14b relative to each other. For example, as shown in FIG. 4, the bracket members 14a, 14b are pivotally adjusted relative to each other about the fasteners 24 to correspond with the shape of the downspout and/or to provide a slightly taper end to the gutter downspout 12. This adjustably may be done to accommodate the wide tolerance variations in dimensions of the downspouts and/or differently sized or configured downspouts. For example, FIGS. 3 and 4 illustrate the shielding assembly 10 attached to a downspout 12 that has a generally rectangular cross-sectional shape (approximately 2 inches by 3 inches) with rounded corners and a curvature that maintains the shorter walls in generally the same plane. Similarly, FIGS. 5 and 6 depict the shielding assembly 10 attached to a downspout 13 with an exposed edge 13a that also has a generally rectangular cross-sectional shape with rounded corners, but a curvature that maintains the longer walls in generally the same plane. Thus, the shielding assembly 10, in addition to being adjustable, can be rotated to attach to differently shaped downspouts.

Figure 7:
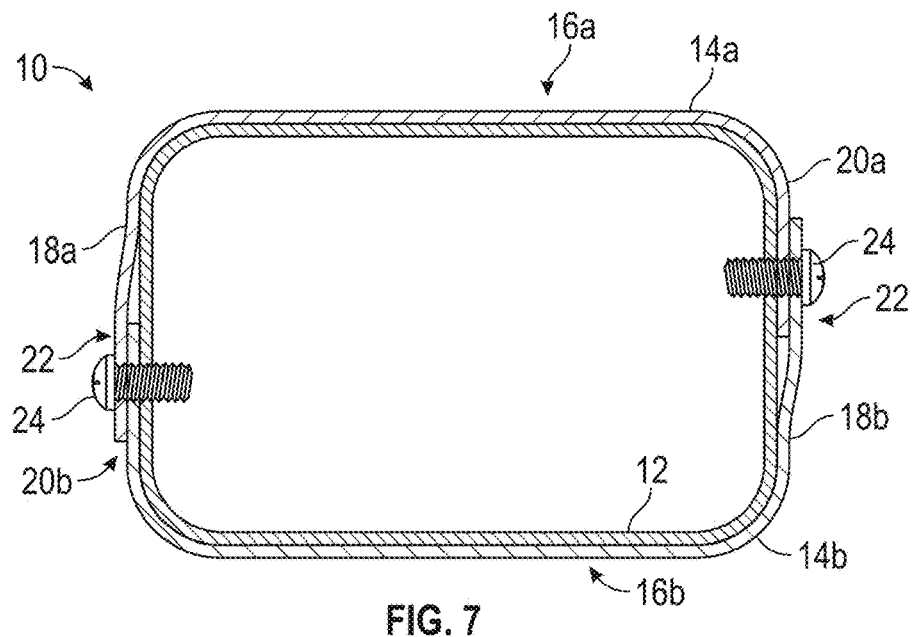
FIG. 7 is a cross-sectional end view of a gutter downspout having a shielding assembly fastened at its open end.
Figure 7A:
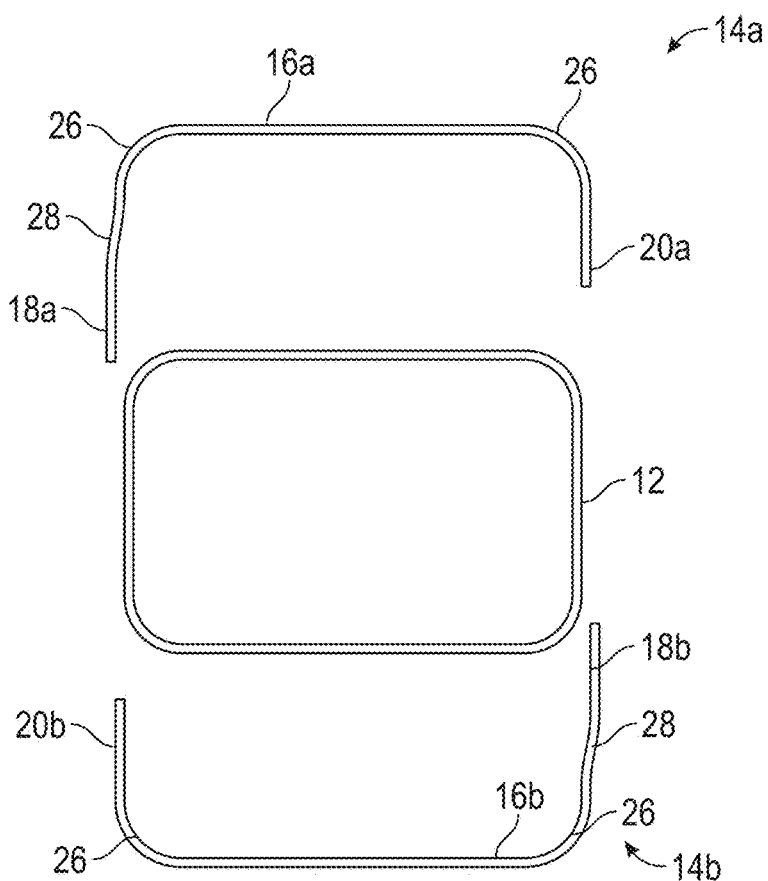
FIG. 7A is an exploded view of the shielding assembly away from the gutter downspout shown in FIG. 7.

The bracket members 14a, 14b, as shown in FIGS. 7 and 7A, each have a substantially planar body portion 16a, 16b and substantially planar leg portions 18a, 18b, 20a, 20b (FIG. 7A) that integrally extend from opposing ends of the body portion 16a, 16b and thus form a substantially U shape. There is a curved transition 26 between the body portions and leg portions that is formed at a radius that is substantially similar to rounded corners of the gutter downspout. The curved transition 26 between the body portions and leg portions is formed by bending a piece of flat metal stock, although it is also conceivable that the brackets may be stamped metal or formed by molding the brackets from a polymer or composite material. Preferably, the bracket members comprise of a non-corrosive metallic material, such as a stainless steel or aluminum.

As also shown in FIGS. 7 and 7A, each bracket member 14a, 14b has a long leg 18a, 18b and a short leg 20a, 20b. The long leg 18a, 18b has an intermediate bend 28 that allows the long leg 18a, 18b to overlap on the outer surface of the opposing short leg 20a, 20b of the opposing bracket member. Thus, the end sections of the legs overlap to provide the overlapping end sections 22. At the overlapping sections 22, the innermost bracket member, shown as the short leg 20a, 20b, has a pilot hole 30 that is sized to be threadably engaged by the fastener 24, which may have self-tapping threads to obviate the need for pilot hole 30 to be threaded during manufacture. The threadable engagement is defined by the outer diameter of the threads being larger than the associated opening, such that the fastener is threadably engaged by rotating the fastener through the opening. The outermost bracket member at the overlapping end sections 22 is shown as the long leg 18a, 18b and is engaged by the head of the fastener 24, such that the fastener 24 is capable of compressing the outermost bracket member against the innermost bracket member to provide a secure and stable connection between the bracket members 14a, 14b. It is also contemplated that the bracket members may alternatively overlap, such as one bracket member having both long legs at the other bracket member having both short legs.

Figure 8:
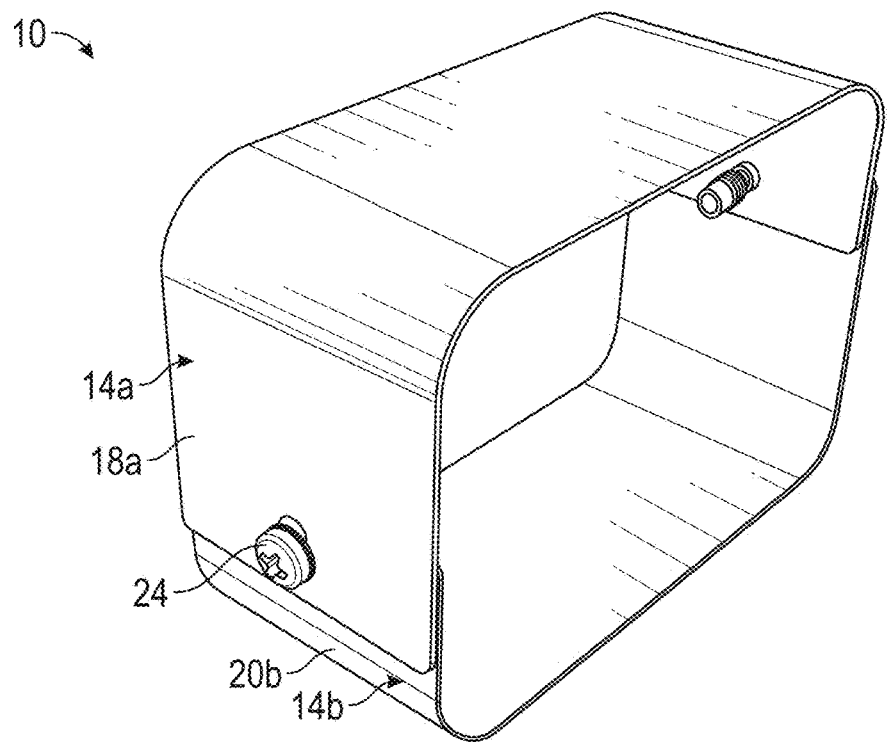
FIG. 8 is a perspective view of a shielding assembly in accordance with the present invention.
Figure 8A:
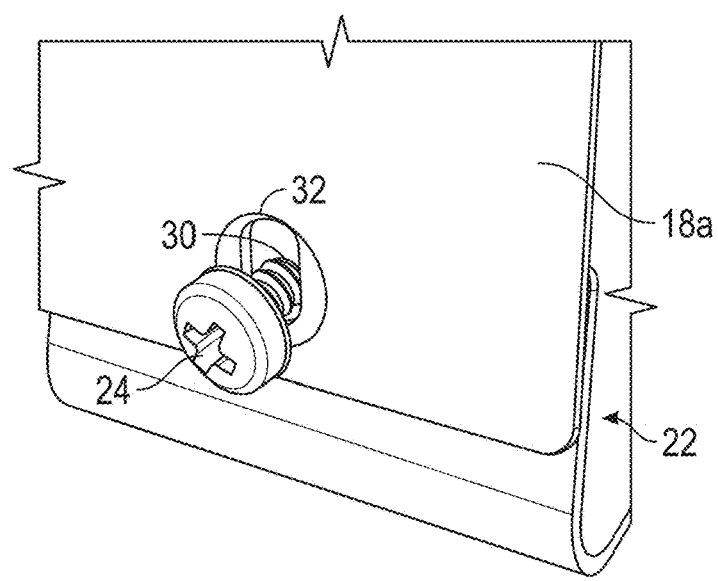
FIG. 8A is an enlarged perspective view of the shielding assembly of FIG. 8, with the fastener partially removed to expose the slot hole in the bracket member.

One of the bracket members 14a, 14b at the overlapping section may have a slot hole 32, such as shown in FIGS. 8 and 8A as the long leg 18a, that allows the fastener 24 to extend through the bracket member and allows the bracket members 14a, 14b to be adjusted relative to each other by allowing the fastener 24 to be moved along the slot hole 32, such as for placing inner surfaces of the body portions of the bracket members in contact with opposing outer walls of the gutter downspout. As shown in FIG. 10A, the pilot hole 30 is positioned at the upper portion of the slot hole 32 to provide the closest potential spacing between the inner surfaces of the body portions of the opposing bracket members. As shown in FIG. 10B, the pilot hole 30 is positioned at the lower portion of the slot hole 32 to provide the further potential spacing between the inner surfaces of the body portions of the opposing bracket members. Thus, the adjustability range provided by the slot hole 32 can be extended or shortened by making the length of the slot holes, respectively, longer or shorter.

As shown in FIG. 9, the threaded portion of the fastener that extends into the interior area of the gutter downspout 12 is engaged with a cap 34 to conceal the tip of the fastener. The illustrated cap 34 includes a tubular polymeric sheath that is deformable to allow the tip of the fastener 24 to engage within the interior of the sheath. It is also conceivable that the cap may alternatively be other shapes, such as a half sphere or other generally rounded piece of material, and may comprise plastic, rubber, and other pliable and deformable materials that would be suitable to prevent injuries when covering a tip of a fastener and when reaching inside the gutter downspout 12 with the hand, such as when clearing debris.

Figure 11:
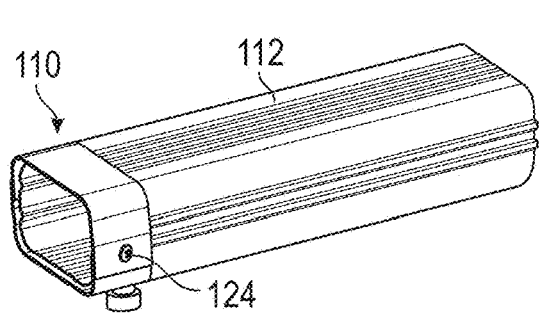
FIG. 11 is a perspective view of another gutter downspout having an additional embodiment of a shielding assembly fastened at its open end.
Figure 12:
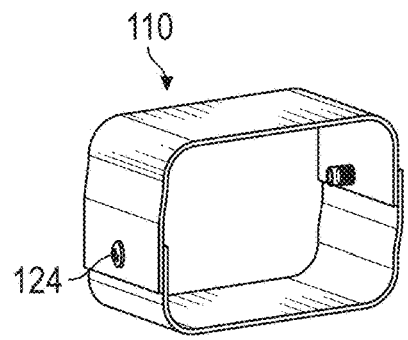
FIG. 12 is a perspective view of the shielding assembly shown in FIG. 11.
Figure 13:
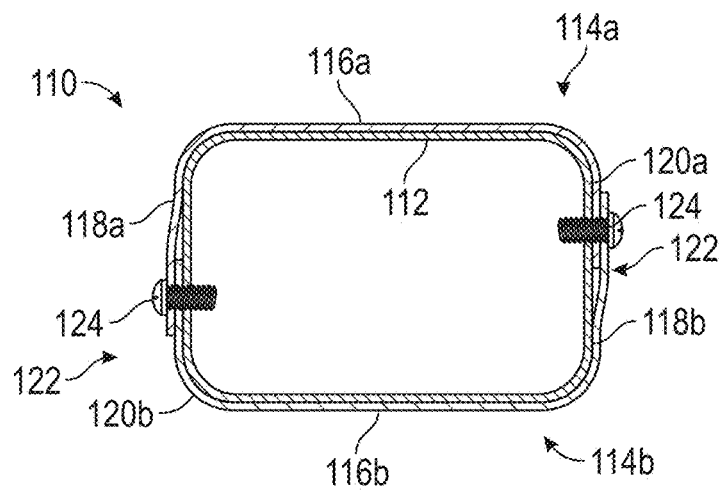
FIG. 13 is a cross-sectional end view of the gutter downspout and the shielding assembly shown in FIG. 11.
Figure 13A:
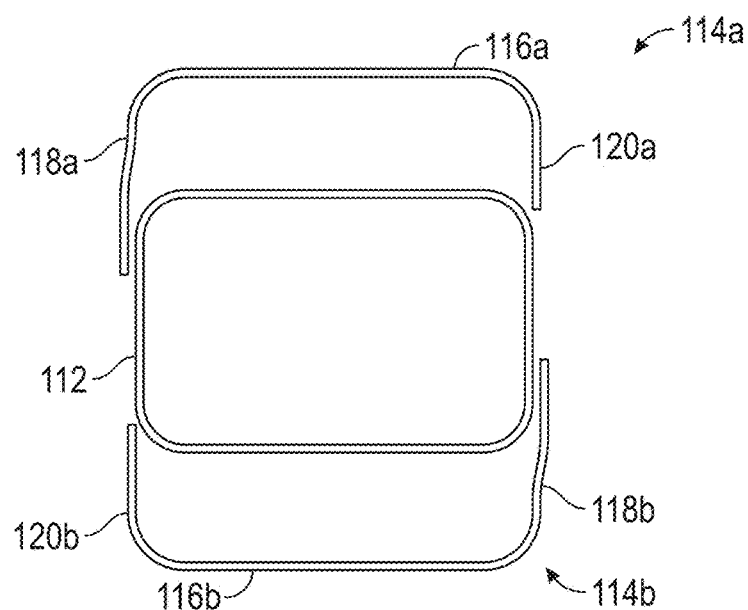
FIG. 13A is an exploded view of the shielding assembly away from the gutter downspout shown in FIG. 13.

Referring now to FIGS. 11-13A, an additional embodiment of the shielding assembly 110 is provided that similarly conceals and supports the exposed edges of an open end of a gutter downspout 112, such that the open end is generally not accessible and not susceptible to damage from string trimmers and the like. However, the shielding assembly 110 is attached to a downspout 112 that has a generally rectangular cross-sectional shape (approximately 3 inches by 4 inches) with rounded corners and a longitudinally straight piece. The shield assembly 110 includes two rigid bracket members 114a, 114b that each have a body portion 116a, 116b and leg portions 118a, 118b, 120a, 120b (FIG. 13A) that integrally extend from opposing ends of the body portion 116a, 116b. The bracket members 114a, 114b engage together around the exposed edges of the gutter downspout 112 with the leg portions overlapped with each other to form overlapping end sections 122. The overlapping end sections 122 are each fastened together and secured to the gutter downspout 112 with a fastener 124 that extends through the respective overlapping end section 122 and an outer wall of the gutter downspout 112. The shield assembly 110 is adjustable to size and orient the bracket assembly in a manner that fits snuggly around the opening and does not inhibit the draining function of the downspout. As shown in FIG. 11, the shielding assembly 110 is tightened on the end of the gutter downspout 112 to slightly crimp or cinch the gutter downspout inward to provide such a tight connection. Unless described otherwise, additional features of the shielding assembly 110 may be substantially similar to those of the shielding assembly 10, such that its components and application may be fully understood with reference to the above description and with reference to like features numbered with like reference numbers increase by one hundred in this embodiment.

Figure 14:
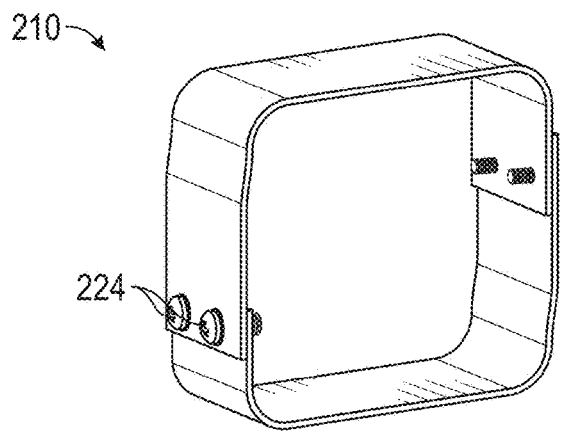
FIG. 14 is a perspective view of an additional embodiment of a shielding assembly.
Figure 15:
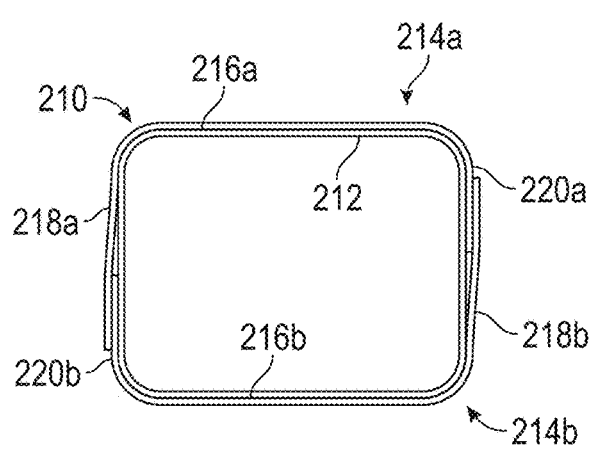
FIG. 15 is a cross-sectional end view of a gutter downspout and the shielding assembly shown in FIG. 14.
Figure 15A:
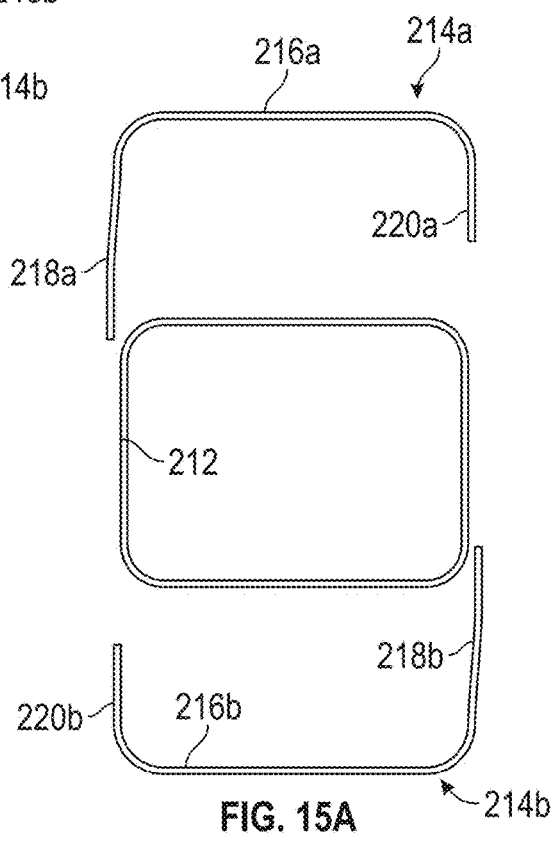
FIG. 15A is an exploded view of the shielding assembly away from the gutter downspout shown in FIG. 15.

Referring now to FIGS. 14-15A, yet another embodiment of the shielding assembly 210 is provided that similarly conceals and supports the exposed edges of an open end of a gutter downspout 212, such that the open end is generally not accessible and not susceptible to damage from string trimmers and the like. However, the shielding assembly 210 is sized to attach to a downspout 212 that has a generally rectangular cross-sectional shape (approximately 4 inches by 5 inches) with rounded corners, such as are more commonly used on commercial buildings. The shield assembly 210 includes two rigid bracket members 214a, 214b that each have a body portion 216a, 216b and leg portions 218a, 218b, 220a, 220b (FIG. 15A) that integrally extend from opposing ends of the body portion 216a, 216b. The bracket members 214a, 214b engage together around the exposed edges of the gutter downspout 212 with the leg portions overlapped with each other to form overlapping end sections 222. In this embodiment, the overlapping end sections 122 are each fastened together and secured to the gutter downspout 212 with two fasteners 224 that extends through the respective overlapping end section 222 and an outer wall of the gutter downspout 212. Although two fasteners are provided, the shield assembly 210 is still adjustable to size and orient (such as pivoting allowed by slotted holes) the bracket assembly in a manner that fits snugly around the opening and does not deter the draining function of the downspout. Unless described otherwise, additional features of the shielding assembly 210 may be substantially similar to those of the shielding assembly 10, such that its components and application may be fully understood with reference to the above description and with reference to like features numbered with like reference numbers increase by two hundred in this embodiment.

Figure 16:
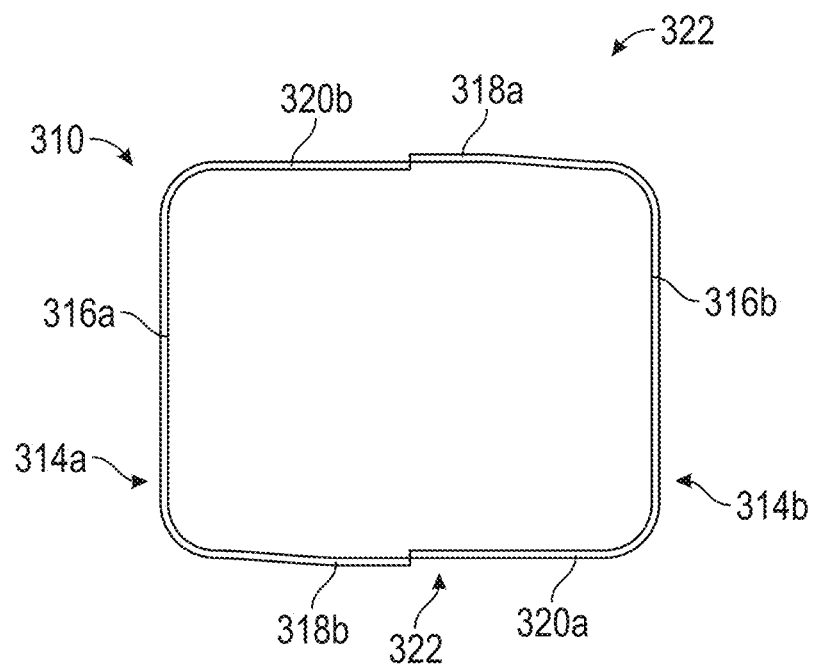
FIG. 16 is a cross-sectional end view of an additional embodiment of a shielding assembly.

Optionally, such as shown in FIG. 16, the shielding assembly 310 may be alternatively configured with the base portions 316a, 316b of the bracket members 314a, 314b oriented generally vertical and with the leg portions 318a, 318b, 320a, 320b oriented generally horizontal. The shielding assembly 310 similarly conceals and supports the exposed edges of an open end of a gutter downspout, such that the open end is generally not accessible and not susceptible to damage from string trimmers and the like. The bracket members 314a, 314b engage together around the exposed edges of the gutter downspout with the leg portions overlapped with each other to form overlapping end sections 322. The overlapping sections are generally centered between the base portions 316a, 316b of the bracket members 314a, 314b, so that one leg is no longer or shorter than the other. Unless described otherwise, additional features of the shielding assembly 310 may be substantially similar to those of the shielding assembly 10, such that its components and application may be fully understood with reference to the above description and with reference to like features numbered with like reference numbers increase by two hundred in this embodiment.

Figure 17:
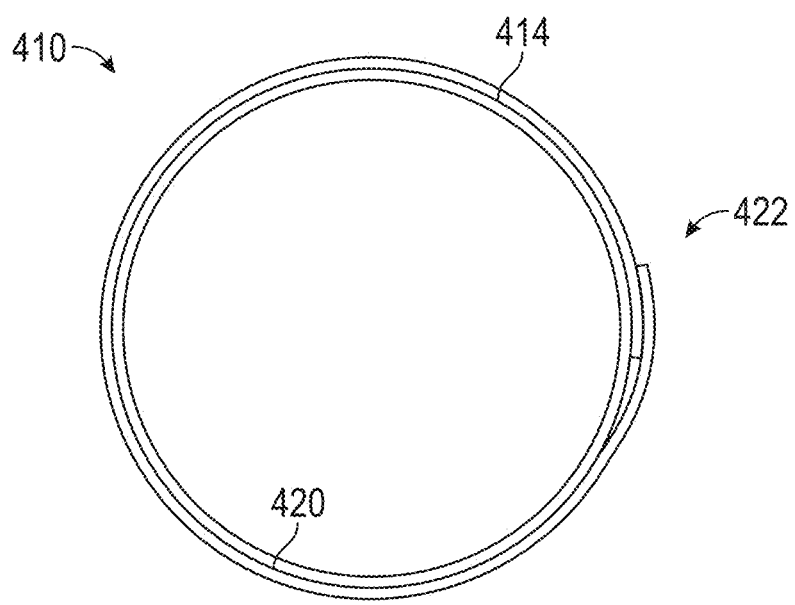
FIG. 17 is a cross-sectional end view of an additional embodiment of a shielding assembly attached around a gutter downspout having a circular cross-sectional shape

Optionally, such as shown in FIG. 17, the shielding assembly 410 may be alternatively configured with a single bracket member 414 that similarly conceals and supports the exposed edges of an open end of a gutter downspout, such that the open end is generally not accessible and not susceptible to damage from string trimmers and the like. As shown in FIG. 17, such a bracket member 414 may surround a gutter downspout 412 with a generally circular cross-sectional shape with ends of the bracket member 414 overlapped with each other to form an overlapping end sections 422 that receives a fastener through the bracket member an into the gutter downspout 412.

Figure 18:
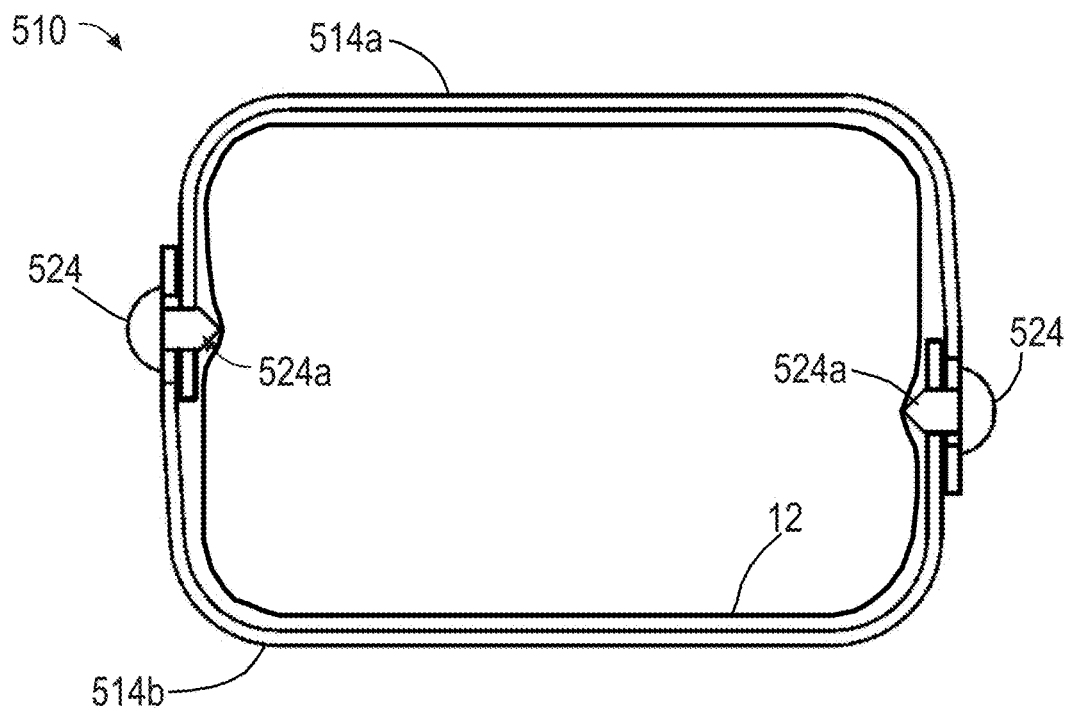
FIG. 18 is a sectional view of another shielding assembly in accordance with the present invention, shown attached to a gutter downspout by impinging fasteners.
Figure 19A:
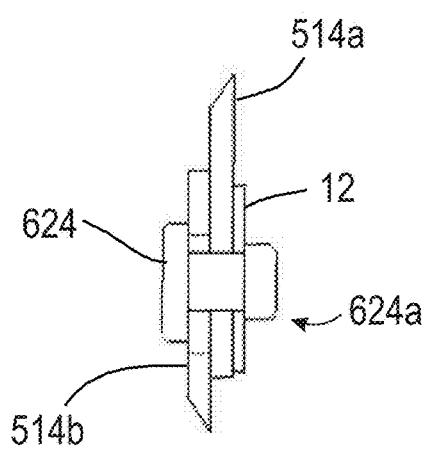
FIGS. 19A and 19B are sectional views of alternative fasteners and corresponding regions of the shielding assembly of FIG. 18.
Figure 19B:
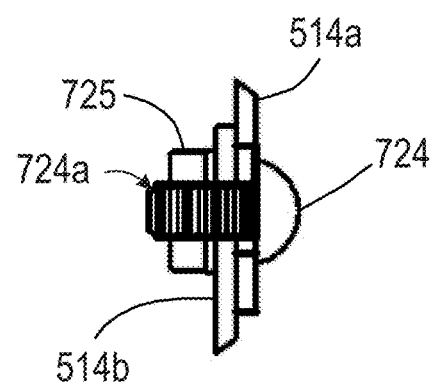

Referring now to FIGS. 18-19B, an additional embodiment of the shielding assembly 510 is provided that is configured similarly to the shielding assembly 10 of FIGS. 3-10B and to the shielding assembly 110 of FIGS. 11-13A, and depicts different styles of fasteners that are configured to reduce or prevent the risk of hand injury if a user were to reach inside of the gutter downspout, such as to clear debris, while obviating the need for a protective cap such as the cap 34 of FIG. 9. For example, with reference to FIG. 18 the shielding assembly 510 includes two rigid bracket members 514a, 514b that are substantially identical to one another so as to be interchangeable, and that are fastened together using threaded fasteners 524 having conical tip portions 524a. In the illustrated embodiment of FIG. 18, tip portions 524a protrude inwardly through the overlapping leg portions of the bracket members 514a, 514b and impinge on (but do not penetrate) the sidewalls of the gutter downspout 12. This impingement causes inward deflection of the sheet material of the gutter downspout in a localized area, thus securing the shielding assembly 510 to the downspout 12. Optionally, the conical tip portions 524a may break through the gutter downspout material, but in that case would still not present any sharp edges creating a risk of injury if a person were to reach into the gutter downspout.

Other types of fasteners may be substituted for the conical-tipped threaded fasteners 524 of FIG. 18. For example, a blind rivet 624 may be used to secure the bracket members 514a, 514b together, and also to gutter downspout 12 through an opening formed therein, such as shown in FIG. 19A. Blind rivet 624 presents only a blunt tip 624a along an interior of the gutter downspout 12, thus reducing or obviating any risk of injury to a person reaching inside the gutter downspout. Another example, shown in FIG. 19B, is a threaded fastener 724 having a blunt tip portion 724a that extends through a threaded nut 725 along an interior surface of the gutter downspout 12. Unless described otherwise, additional features of the shielding assembly 510 may be substantially similar to those of the shielding assembly 10, such that its components and application may be fully understood with reference to the above description.

Figure 2:
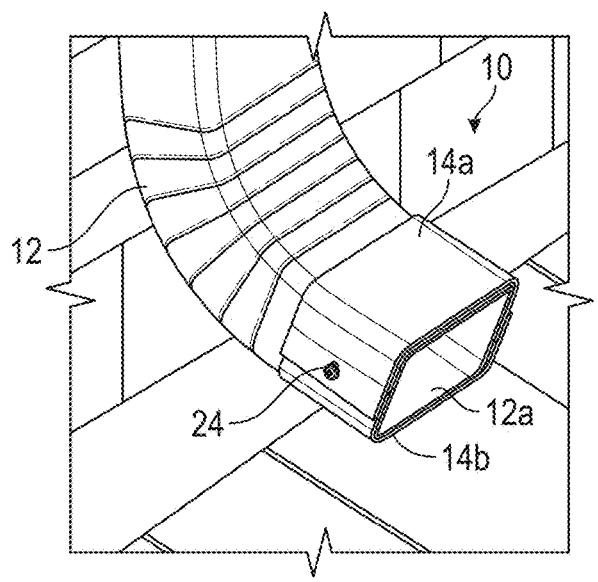
FIG. 2 is a perspective view of a gutter downspout having a shielding assembly fastened at the open end, in accordance with the present invention.

For purposes of this disclosure, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A shielded rain gutter downspout assembly comprising:
a gutter downspout having an open end;
first and second rigid bracket members that each have a body portion and first and second leg portions that integrally extend from opposing ends of the body portion;
wherein the first and second rigid bracket members are configured to engage together around exposed edges at the open end of the gutter downspout with the first leg portion of the first rigid bracket member overlapped with the second leg portion of the second rigid bracket member and the first leg portion of the second rigid bracket member overlapped with the second leg portion of the first rigid bracket member to form respective overlapping end sections along opposite sides of the open end of the gutter downspout, and with each body portion configured to extend around a respective opposite side of the gutter downspout; and
a fastener configured to extend through openings formed in the first and second leg portions at each of the overlapping end sections, and to engage an outer wall of the gutter downspout to secure the overlapping end sections to the gutter downspout.

2. The shielded rain gutter downspout assembly of claim 1, wherein the body portion of each of the first and second rigid bracket members is substantially planar and the first and second leg portions extend in a generally perpendicular orientation from a respective body portion to form a substantially U shape.

3. The shielded rain gutter downspout assembly of claim 1, wherein the second leg portion at each of the overlapping end sections defines a pilot hole that is sized to be threadably engaged by the fastener.

4. The shielded rain gutter downspout assembly of claim 3, wherein the first leg portion at each of the overlapping end sections defines a slot hole that is configured for the fastener to extend through and to allow the first and second rigid bracket members to be adjusted relative to each other for placing inner surfaces of the body portions in contact with opposing outer walls of the gutter downspout.

5. The shielded rain gutter downspout assembly of claim 4, wherein the first leg portions are longer than the second leg portions.

6. The shielded rain gutter downspout assembly of claim 1, wherein the fasteners comprise tip portions configured to impinge upon the outer wall of the gutter downspout without penetrating the outer wall of the gutter downspout.

7. The shielded rain gutter downspout assembly of claim 1, wherein the fasteners comprise at least one chosen from threaded self-tapping screws, threaded bolts in combination with threaded nuts, and blind rivets.

8. The shielded rain gutter downspout assembly of claim 1, wherein the first rigid bracket member is substantially identical to and interchangeable with the second rigid bracket member.

* * * * *